(12) United States Patent
Tsai et al.

(10) Patent No.: US 7,609,307 B2
(45) Date of Patent: Oct. 27, 2009

(54) HETEROGENEITY-PROJECTION HARD-DECISION INTERPOLATION METHOD FOR COLOR REPRODUCTION

(75) Inventors: Chi-Yi Tsai, Kaohsiung (TW); Kai-Tai Song, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 594 days.

(21) Appl. No.: 11/519,959

(22) Filed: Sep. 13, 2006

(65) Prior Publication Data

US 2008/0062479 A1     Mar. 13, 2008

(51) Int. Cl.
H04N 3/14       (2006.01)
H04N 5/335      (2006.01)
G06K 9/32       (2006.01)

(52) U.S. Cl. .................. 348/273; 348/277; 348/280; 382/299; 382/300; 358/518; 358/525

(58) Field of Classification Search ............. 348/266, 348/268, 272, 273, 275, 277, 280; 358/518, 358/525; 382/162, 167, 263, 266, 299, 300
See application file for complete search history.

(56) References Cited

U.S. PATENT DOCUMENTS

| | | | | |
|---|---|---|---|---|
| 4,630,307 A | * | 12/1986 | Cok | ............... 382/165 |
| 5,373,322 A | * | 12/1994 | Laroche et al. | ............ 348/273 |
| 5,629,734 A | * | 5/1997 | Hamilton et al. | ......... 348/222.1 |
| 6,404,918 B1 | | 6/2002 | Hel-or et al. | |
| 6,618,503 B2 | | 9/2003 | Hel-or et al. | |
| 6,625,305 B1 | | 9/2003 | Keren | |
| 6,809,765 B1 | | 10/2004 | Tao | |
| 6,978,050 B2 | | 12/2005 | Hunter et al. | |
| 6,989,862 B2 | | 1/2006 | Baharav et al. | |
| 7,030,917 B2 | | 4/2006 | Taubman | |
| 7,072,509 B2 | | 7/2006 | Hunter et al. | |
| 7,532,773 B2 | * | 5/2009 | Lu et al. | ..................... 382/300 |

* cited by examiner

*Primary Examiner*—Nhan T Tran
*Assistant Examiner*—Chriss S Yoder, III
(74) *Attorney, Agent, or Firm*—Rosenberg, Klein & Lee

(57) ABSTRACT

The present invention discloses a heterogeneity-projection hard-decision interpolation method for color reproduction, which utilizes a heterogeneity-projection method to determine the optimal edge direction and then utilizes a hard-decision rule to determine the optimal interpolation direction and obtain the information of the green color elements. The high-frequency information of the plane of the green color elements is incorporated into the processing of the planes of the red color elements and the blue color elements to reduce the restoration errors of the red and blue color elements. Therefore, the present invention can decrease the interpolation-direction errors and achieve a higher PSNR and a better visual effect.

19 Claims, 22 Drawing Sheets
(18 of 22 Drawing Sheet(s) Filed in Color)

| G | B | G | B |
|---|---|---|---|
| R | G | R | G |
| G | B | G | B |
| R | G | R | G |
| G | B | G | B |

HETEROGENEITY-PROJECTION HARD-DECISION INTERPOLATION METHOD FOR COLOR REPRODUCTION

BACKGROUND OF THE INVENTION

1. Field of the Invention

The present invention relates to an interpolation method for color reproduction, particularly to a heterogeneity-projection hard-decision interpolation method for color reproduction.

2. Description of the Related Art

The digital camera uses a lens to project scenes onto a Charge Coupled Device (CCD), and the CCD transforms the scenes into digital image signals, and next, the digital image signals are processed by electronic circuits and then stored in a storage medium. The CCD cannot sense light colors but can only sense light intensity. Therefore, a color-separation filter needs to be arranged before the light-sensing element for a digital sampling. Generally, the color-separation filter uses the RGB (three primary colors) color model. The color components separately acquired by three CCD's are combined into a full-color image. In considering cost and volume, the digital camera usually uses only a single CCD. Each pixel only has the gray-level value of one of three primary colors, and the other two color elements are lost. Therefore, the result obtained by the CCD needs to be processed using an interpolation algorithm to reconstruct the missing color elements.

Generally, image interpolation methods may be classified into the fixed type and the non-fixed type. In the fixed type image interpolation method, the weight values of the neighboring pixels are fixed in reproducing the missing color element. The fixed type method lacks the edge detection capability; thus, the edges of the output image appear blurred, and the detailed texture cannot be recovered well. In the non-fixed type image interpolation method, the weight values of the neighboring pixels are unfixed in reproducing the missing color element. The non-fixed type method possesses the edge detection capability; thus, the edge blurs of the output image are greatly reduced in the horizontal and vertical directions. However, the detailed texture cannot be recovered well in the non-fixed type method either.

A Taiwan patent No. 00548956 proposed a "Color Interpolation Method For Digital Images". However, such a conventional technology has color distortion in the rebuilt digital color images. Besides, the detailed texture cannot be well recovered either.

Accordingly, the present invention proposes a heterogeneity-projection hard-decision interpolation method for color reproduction, which can effectively interpolate the edges of digital images and can sensitively detect the passage of an edge and can thus effectively recover the details of texture.

SUMMARY OF THE INVENTION

The primary objective of the present invention is to provide a heterogeneity-projection hard-decision interpolation method for color reproduction, which uses a heterogeneity-projection technology and a hard-decision rule to determine the optimal interpolation direction and reduce the interpolation-direction errors occurring in interpolation stage.

Another objective of the present invention is to provide a heterogeneity-projection hard-decision interpolation method for color reproduction, which can effectively reduce the edge blurs in the rebuilt digital color image and can effectively recover the details of the texture in the rebuilt digital color image.

Still another objective of the present invention is to provide a heterogeneity-projection hard-decision interpolation method for color reproduction, which can reproduce the missing color elements of the pixels formed by a color filter array (CFA) and make the color performance of the rebuilt digital color image more close to the original object.

Further another objective of the present invention is to provide a heterogeneity-projection hard-decision interpolation method for color reproduction, which can integrate with the existing fixed type and non-fixed type image interpolation methods and promote the performance of the existing interpolation methods.

According to one aspect of the present invention, the heterogeneity-projection hard-decision interpolation method for color reproduction comprises the following steps: acquiring an image to form a Bayer-pattern digital image, which consists of a plurality of pixels, including a plurality of red pixels, blue pixels and green pixels; utilizing a heterogeneity-projection method to horizontally and vertically project the original Bayer-pattern digital image onto horizontal and vertical heterogeneity maps, and utilizing an image-restoration technology to obtain the optimized horizontal and vertical heterogeneity maps; utilizing the obtained optimized horizontal and vertical heterogeneity maps to form horizontal, vertical and smooth subsets according to a hard-decision rule; respectively performing horizontal, vertical and average interpolations inside the horizontal, vertical and smooth subsets to reproduce all the missing color elements; utilizing the current red color elements and the current blue color elements of all the pixels to correct the current green color elements of all the pixels and obtain a color-corrected plane of green color elements; utilizing the color-corrected green color elements of all the pixels to correct the current red color elements and the current blue color elements of all the pixels and obtain a color-corrected plane of red color elements and a color-corrected plane of blue color elements; and repeating the last two steps several times to obtain a color-corrected digital color image.

To enable the objectives, technical contents, characteristics and accomplishments of the present invention to be easily understood, the embodiments of the present invention are to be described in detail in cooperation with the attached drawings below.

The file of this Patent contains at least one Drawing Figure executed in color. Copies of the Patent with color Drawings will be provided by the Patent and Trademark Office upon request and payment of the necessary fee.

BRIEF DESCRIPTION OF THE DRAWINGS

The file of this Patent contains at least ond Drawing Figure executed in color. Copies of the Patent with color Drawings will be provided by the Patent and Trademark Office upon request and payment of the necessary fee.

FIG. 2 is a diagram schematically showing a Bayer-pattern color filter array;

DETAILED DESCRIPTION OF THE INVENTION

The present invention pertains to a heterogeneity-projection hard-decision interpolation method for color reproduction, which uses a heterogeneity-projection technology and a hard-decision rule to determine the optimal interpolation direction and reduce the interpolation-direction errors occurring in performing interpolations.

Figure 1:
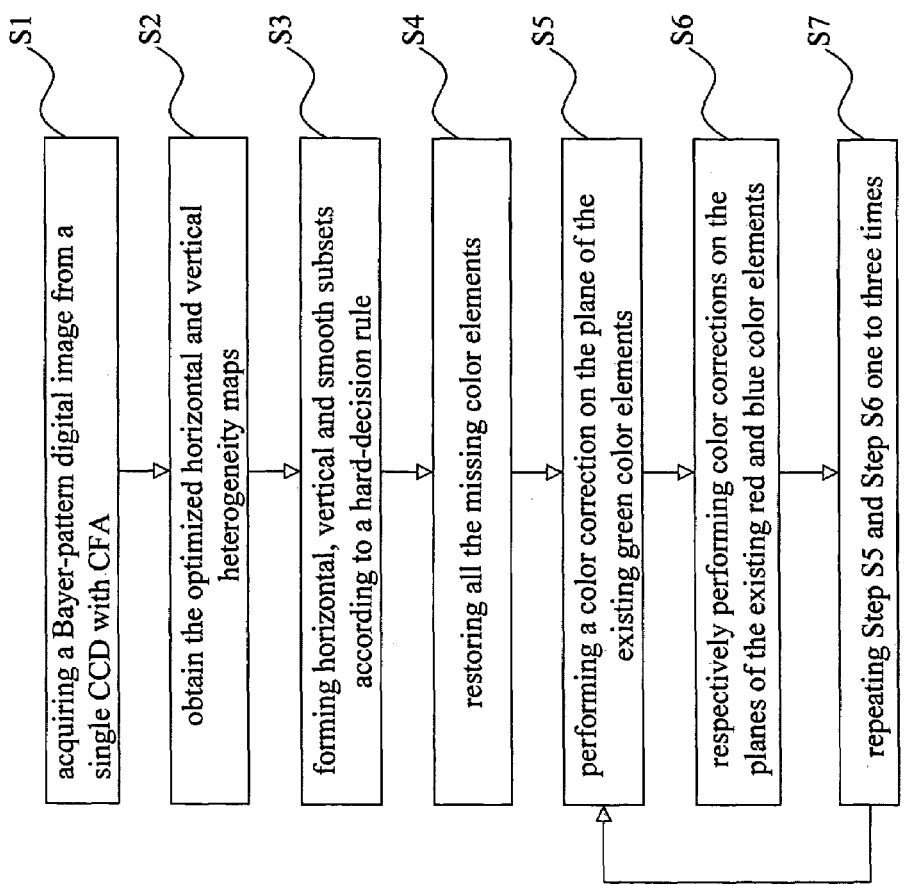
FIG. 1 is a flowchart of the method of the present invention.

Refer to FIG. 1 a flowchart of the method of the present invention. The method of the present invention, which can restore the missing color elements for each pixel in a Bayer-pattern digital image, comprises the following steps: acquiring a Bayer-pattern digital image from a single CCD with CFA (Step S1); obtain the optimized horizontal and vertical heterogeneity maps (Step S2); forming horizontal, vertical and smooth subsets according to a hard-decision rule (Step S3); restoring all the missing color elements (Step S4); performing a color modification on the plane of the existing green color elements (Step S5); respectively performing color modifications on the planes of the existing red and blue color elements (Step S6); repeating Step S5 and Step S6 one to three times (Step S7). The abovementioned steps will be described in detail below.

Figure 2:
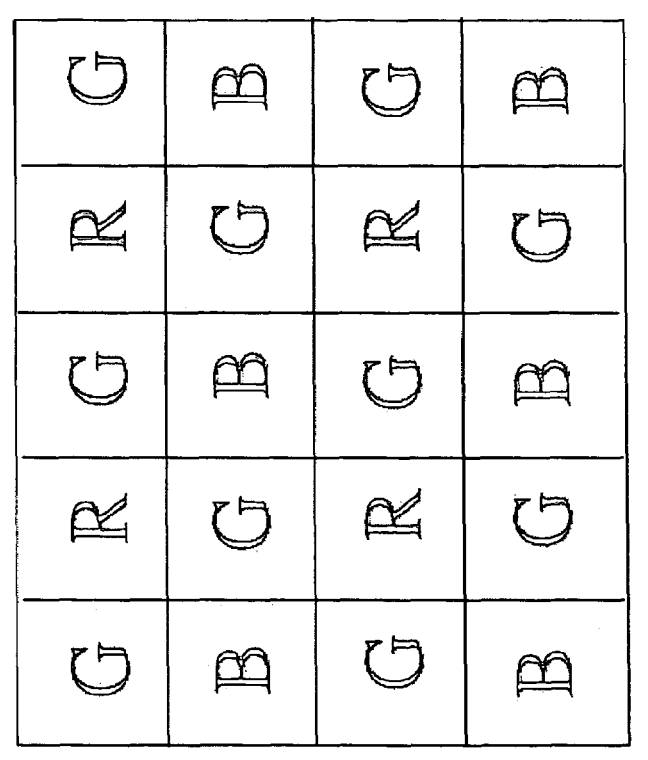

In Step S1, a single CCD and a Bayer-pattern CFA are used to obtain a Bayer-pattern digital image, which consists of a plurality of pixels, including red, blue and green pixels. Each pixel only has the gray-level value of a single color element. Refer to FIG. 2 a diagram schematically showing a Bayer-pattern CFA.

In Step S2, the optimized horizontal and vertical heterogeneity maps are to be worked out. Firstly, an N×1 heterogeneity-projection vector is obtained with Equation (1):

$$P_{N \times 1} = H_{N \times M} V_{M \times 1} \tag{1}$$

wherein the N×M matrix $H_{N \times M}$ is obtained with Equation (2):

$$H_{N \times M} = [1\ -1\ -1\ 1]^T \otimes \text{eye}(M) \tag{2}$$

and the M×1 vector $V_{M \times 1}$ is obtained with Equation (3):

$$V_{M \times 1} = \prod_{i=1}^{M-1} [1\ -1]^T \otimes \text{eye}(M-i); \tag{3}$$

M=N−3, and N is an integer equal to or greater than 5; $\otimes$ denotes the 2D convolution operator, and eye(M) denotes an M×M identity matrix. The heterogeneity-projection vector $P_{N \times 1}$ is used to obtain the horizontal and vertical heterogeneity maps with Equation (4) and (5):

$$H_{h\_map} = |\text{Bayer} \otimes P_{N \times 1}^T| \tag{4}$$

$$H_{v\_map} = |\text{Bayer} \otimes P_{N \times 1}| \tag{5},$$

wherein Bayer denotes the original Bayer-pattern digital image.

Image-restoration technologies, such as the mean filter, the median filter and the adaptive filter, are used to directionally filter out the noise of the horizontal and vertical heterogeneity maps obtained with Equation (4) and (5), i.e. to filter out the horizontal noise of the horizontal heterogeneity map $H_{h\_map}$ and filter out the vertical noise of the vertical heterogeneity map $H_{v\_map}$.

Figure 3:
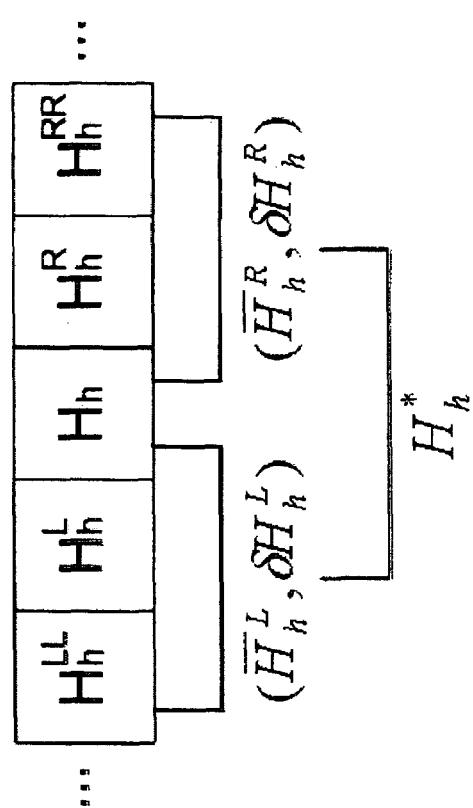
FIG. 3 is a diagram schematically showing that a horizontal adaptive-filtering process is performed on an element $H_h$ of the horizontal heterogeneity map $H_{h\_map}$.

Herein, a directional noise-filtering method implemented with the adaptive filter is to be described below. Refer to FIG. 3 a diagram schematically showing that a horizontal-direction adaptive filtering is performed on one pixel $H_h$ of the horizontal heterogeneity map $H_{h\_map}$. The horizontal-direction adaptive filtering is performed on each pixel $H_h$ of the horizontal heterogeneity map $H_{h\_map}$ according to Equation (6):

$$H_h^* = \overline{H}_h^L + \frac{\delta H_h^L}{\delta H_h^L + \delta H_h^R}(\overline{H}_h^R - \overline{H}_h^L) \tag{6}$$

wherein $H^*_h$ denotes the optimal estimated value of the adaptively filtered pixel $H_h$; $H_h^L$ denotes the left neighboring pixel of $H_h$, and $(\overline{H}_h^L, \delta H_h^L)$ are respectively the local mean and variance of the $H_h^L$-centered 1×N window; $H_h^R$ denotes the right neighboring pixel of $H_h$, and $(\overline{H}_h^R, \delta H_h^R)$ are respectively the local mean and variance of the $H_h^R$-centered 1×N window. After all the pixels of $H_{\_map}$ are processed with Equation (6), the optimized horizontal heterogeneity map $H^*_{h\_map}$ is obtained.

Figure 4:
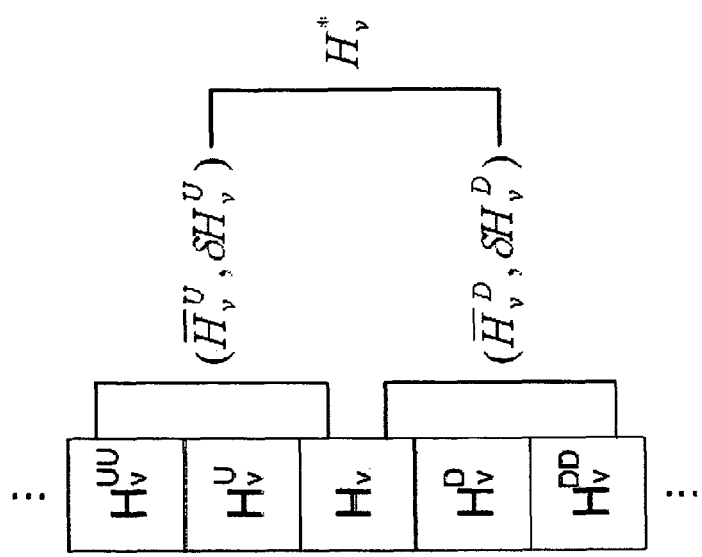
FIG. 4 is a diagram schematically showing that a vertical adaptive-filtering process is performed on an element $H_v$ of the horizontal heterogeneity map $H_{v\_map}$.

Refer to FIG. 4 a diagram schematically showing that a vertical-direction adaptive filtering is performed on one pixel $H_v$ of the vertical heterogeneity map $H_{h\_map}$. The vertical-direction adaptive filtering is performed on each pixel $H_v$ of the vertical heterogeneity map $H_{v\_map}$ according to Equation (7):

$$H_v^* = \overline{H}_v^U + \frac{\delta H_v^U}{\delta H_v^U + \delta H_v^D}(\overline{H}_v^D - \overline{H}_v^U) \quad (7)$$

wherein $H_v^*$ denotes the optimal estimated value of the adaptively filtered pixel $H_v$; $H_v^U$ denotes the upside neighboring pixel of $H_v$, and $(\overline{H}_v^U, \delta H_v^U)$ are respectively the local mean and variance of the $H_v^U$-centered N×1 window; $H_v^D$ denotes the downside neighboring pixel of $H_v$, and $(\overline{H}_v^D, \delta H_v^D)$ are respectively the local mean and variance of the $H_v^D$-centered N×1 window.

In Step S3, the hard-decision rule is used to separate a horizontal subset $\Omega_h$, a vertical subset $\Omega_v$ and a smooth subset $\Omega_s$ from the image according to Equations (8), (9) and (10):

$$\Omega_h = \{(x,y) | H^*_{h\_map}(x,y) < \alpha H^*_{v\_map}(x,y)\} \quad (8)$$

$$\Omega_v = \{(x,y) | H^*_{v\_map}(x,y) < \alpha H^*_{h\_map}(x,y)\} \quad (9)$$

$$\Omega_s = \{(x,y) | (x,y) \notin \Omega_h, (x,y) \notin \Omega_v\} \quad (10)$$

wherein (x,y) is the position of one pixel of the image, and α is a scalar factor within 0 to 1.

In Step S4, all the missing color elements are restored. Firstly, all the missing green color elements are restored. Then, the restored green color elements are used to restore all the missing red and blue color elements.

Restoring the Green Color Elements

Figure 5:
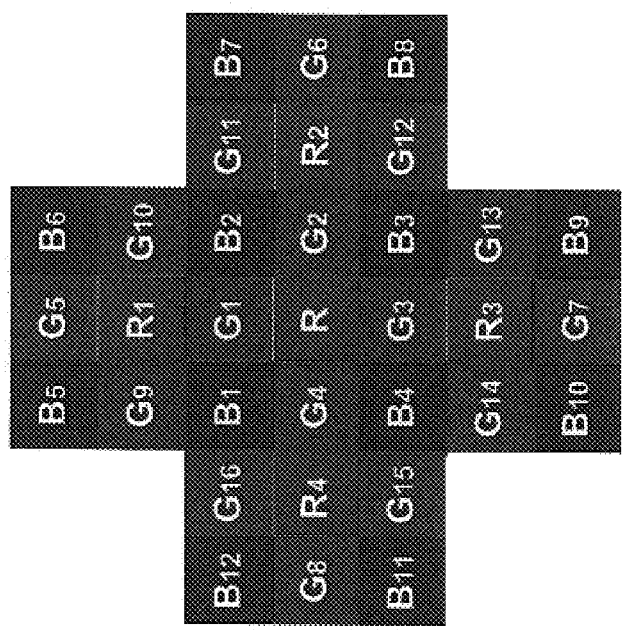
FIG. 5 is a diagram schematically showing the calculation for the missing green color elements of the red pixels according to the present invention.

Refer to FIG. 5 a diagram schematically showing that the missing green color elements of the red pixels are worked out according to the method of the present invention. For restoring the green color elements of the red pixels, the color-adjusted values and the corresponding weight values of four green pixels surrounding each one of a plurality of the red pixels are respectively worked out according to Equation (11):

$$\hat{G}_i = G_i + (R - R_i)/2, \quad (11)$$

$$w_i = e_i \bigg/ \sum_{k=1}^{4} e_i, \; i = 1 \sim 4$$

wherein $\hat{G}_i$ denotes the color-adjusted value of one of four green pixels surrounding one red pixel, and $w_i$ is the weight value corresponding to the color-adjusted value, and $e_i$ is the edge indicator of one of four green pixels surrounding the red pixel. The edge indicator $e_i$ can be worked out with Equations (12-1) to (12-4):

$$e_1 = \left( 1 + |G_1 - G_3| + |G_5 - G_1| + |R_1 - R| + \left|\frac{G_9 - G_4}{2}\right| + \left|\frac{G_{10} - G_2}{2}\right| \right)^{-1} \quad (12\text{-}1)$$

$$e_2 = \left( 1 + |G_2 - G_4| + |G_6 - G_2| + |R_2 - R| + \left|\frac{G_{11} - G_1}{2}\right| + \left|\frac{G_{12} - G_3}{2}\right| \right)^{-1} \quad (12\text{-}2)$$

$$e_3 = \left( 1 + |G_1 - G_3| + |G_3 - G_7| + |R - R_3| + \left|\frac{G_2 - G_{13}}{2}\right| + \left|\frac{G_4 - G_{14}}{2}\right| \right)^{-1} \quad (12\text{-}3)$$

$$e_4 = \left( 1 + |G_2 - G_4| + |G_4 - G_8| + |R - R_4| + \left|\frac{G_1 - G_{16}}{2}\right| + \left|\frac{G_3 - G_{15}}{2}\right| \right)^{-1} \quad (12\text{-}4)$$

If the position of a red pixel $(x_R, y_R)$ belongs to the smooth subset $\Omega_s$, the green color element of the red pixel is worked out with Equation (13):

$$G = \sum_{i=1}^{4} w_i \hat{G}_i \quad (13)$$

If the position of a red pixel $(x_R, y_R)$ belongs to the horizontal subset $\Omega_h$, the green color element of the red pixel is worked out with Equation (14):

$$G = \frac{w_2 \hat{G}_2 + w_4 \hat{G}_4}{w_2 + w_4} \quad (14)$$

If the position of a red pixel $(x_R, y_R)$ belongs to the vertical subset $\Omega_v$, the green color element of the red pixel is worked out with Equation (15):

$$G = \frac{w_1 \hat{G}_1 + w_3 \hat{G}_3}{w_1 + w_3} \quad (15)$$

Figure 6:
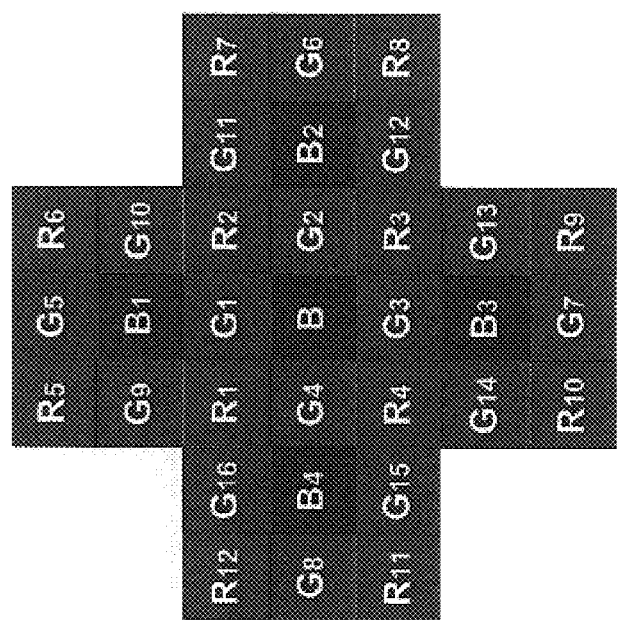
FIG. 6 is a diagram schematically showing the calculation for the missing green color elements of the blue pixels according to the present invention.

Refer to FIG. 6 a diagram schematically showing that the missing green color elements of the blue pixels are worked out according to the method of the present invention. For restoring the green color elements of the blue pixels, the color-adjusted values and the corresponding weight values of four green pixels surrounding each one of a plurality of the blue pixels are respectively worked out according to Equation (16):

$$\hat{G}_i = G_i + (B - B_i)/2, \quad (16)$$

$$w_i = e_i \bigg/ \sum_{k=1}^{4} e_k,$$

$$i = 1 \sim 4$$

wherein $\hat{G}_i$ denotes the color-adjusted value of one of four green pixels surrounding one blue pixel, and $w_i$ is the weight value corresponding to the color-adjusted value, and $e_i$ is the edge indicator of one of four green pixels surrounding the blue pixel. The edge indicator $e_i$ can be worked out with Equations (17-1) to (17-4):

$$e_1 = \left( 1 + |G_1 - G_3| + |G_5 - G_1| + |B_1 - B| + \left|\frac{G_9 - G_4}{2}\right| + \left|\frac{G_{10} - G_2}{2}\right| \right)^{-1} \quad (17\text{-}1)$$

-continued $$e_2 = \left(1 + |G_2 - G_4| + |G_6 - G_2| + |B_2 - B| + \left|\frac{G_{11} - G_1}{2}\right| + \left|\frac{G_{12} - G_3}{2}\right|\right)^{-1} \quad (17\text{-}2)$$

$$e_3 = \left(1 + |G_1 - G_3| + |G_3 - G_7| + |B - B_3| + \left|\frac{G_2 - G_{13}}{2}\right| + \left|\frac{G_4 - G_{14}}{2}\right|\right)^{-1} \quad (17\text{-}3)$$

$$e_4 = \left(1 + |G_2 - G_4| + |G_4 - G_8| + |B - B_4| + \left|\frac{G_1 - G_{16}}{2}\right| + \left|\frac{G_3 - G_{15}}{2}\right|\right)^{-1} \quad (17\text{-}4)$$

The missing green color element of one blue pixel is worked out with one of Equations (13) to (15).

Restoring the Red Color Elements

Figure 7:
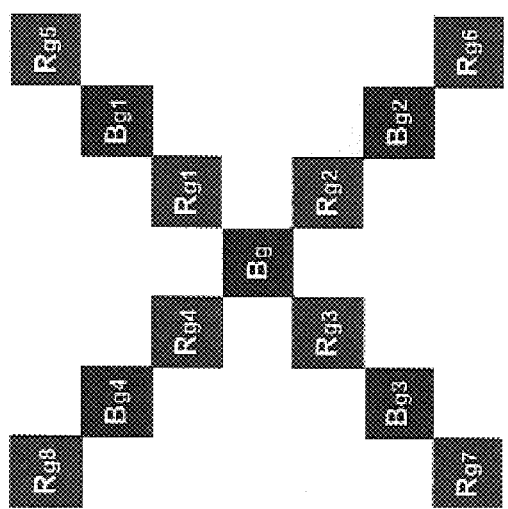
FIG. 7 is a diagram schematically showing the calculation for the missing red color elements of the blue pixels according to the present invention.

Refer to FIG. 7 a diagram schematically showing that the missing red color elements of the blue pixels are worked out according to the method of the present invention. For restoring the red color elements of the blue pixels, the bilinear interpolation method is used to preliminarily restore all the missing red color elements, and the plane of the restored green color elements is subtracted from the plane of the preliminarily restored red color elements to obtain a color-difference plane $R_g$ ($R_g = R - G$) therebetween. The missing red color element of one blue pixel is worked out with Equation (18):

$$R_g = \frac{e_{a1}\hat{R}_{g1} + e_{a2}\hat{R}_{g2} + e_{a3}\hat{R}_{g3} + e_{a4}\hat{R}_{g4}}{e_{a1} + e_{a2} + e_{a3} + e_{a4}} \quad (18)$$

wherein $\hat{R}_{gi}$ i=1~4 denotes the adjusted value of red color difference, and $e_{ai}$ i=1~4 denotes the edge indicator of color difference.

Figure 8:
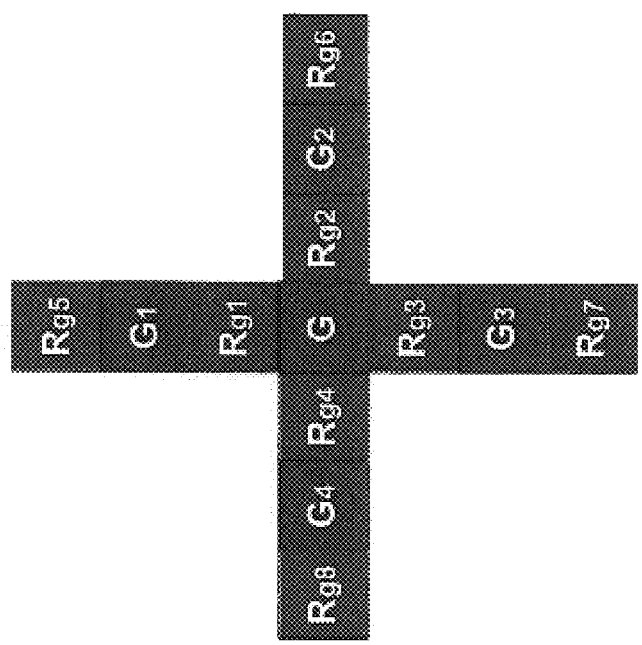
FIG. 8 is a diagram schematically showing the calculation for the missing red color elements of the green pixels according to the present invention.

Refer to FIG. 8 a diagram schematically showing that the missing red color elements of the green pixels are worked out according to the method of the present invention. The restored green color elements and the restored red color elements of the blue pixels are used to restore the missing red color elements of the green pixels. If the position of a green pixel ($x_G$,$y_G$) belongs to the smooth subset $\Omega_s$, the missing red color element of the green pixel is worked out with Equation (19):

$$R_g = \frac{e_{b1}\hat{R}_{g1} + e_{b2}\hat{R}_{g2} + e_{b3}\hat{R}_{g3} + e_{b4}\hat{R}_{g4}}{e_{b1} + e_{b2} + e_{b3} + e_{b4}} \quad (19)$$

If the position of a green pixel ($x_G$,$y_G$) belongs to the horizontal subset $\Omega_h$, the missing red color element of the green pixel is worked out with Equation (20):

$$R_g = \frac{e_{b2}\hat{R}_{g2} + e_{b4}\hat{R}_{g4}}{e_{b2} + e_{b4}} \quad (20)$$

If the position of a green pixel ($x_G$,$y_G$) belongs to the vertical subset $\Omega_v$, the missing red color element of the green pixel is worked out with Equation (21):

$$R_g = \frac{e_{b1}\hat{R}_{g1} + e_{b3}\hat{R}_{g3}}{e_{b1} + e_{b3}} \quad (21)$$

The adjusted values of red color difference $\hat{R}_{gi}$ i=1~4 in Equations (18) to (21) can be worked out with Equations (22-1) to (22-4):

$$\hat{R}_{g1} = R_{g1} + \frac{R_{g3} - R_{g1}}{2} \quad (22\text{-}1)$$

$$\hat{R}_{g2} = R_{g2} + \frac{R_{g4} - R_{g2}}{2} \quad (22\text{-}2)$$

$$\hat{R}_{g3} = R_{g3} + \frac{R_{g1} - R_{g3}}{2} \quad (22\text{-}3)$$

$$\hat{R}_{g4} = R_{g4} + \frac{R_{g2} - R_{g4}}{2} \quad (22\text{-}4)$$

Refer to FIG. 7 again. The edge indicators of color difference $e_{ai}$ i=1~4 can be obtained with Equations (23-1) to (23-4):

$$e_{a1} = \left(1 + \left|\frac{R_{g1} - R_{g3}}{2\sqrt{2}}\right| + \left|\frac{R_{g5} - 2R_{g1} + R_{g3}}{2\sqrt{2}}\right|\right)^{-1} \quad (23\text{-}1)$$

$$e_{a2} = \left(1 + \left|\frac{R_{g4} - R_{g2}}{2\sqrt{2}}\right| + \left|\frac{R_{g4} - 2R_{g2} + R_{g6}}{2\sqrt{2}}\right|\right)^{-1} \quad (23\text{-}2)$$

$$e_{a3} = \left(1 + \left|\frac{R_{g1} - R_{g3}}{2\sqrt{2}}\right| + \left|\frac{R_{g1} - 2R_{g3} + R_{g7}}{2\sqrt{2}}\right|\right)^{-1} \quad (23\text{-}3)$$

$$e_{a4} = \left(1 + \left|\frac{R_{g4} - R_{g2}}{2\sqrt{2}}\right| + \left|\frac{R_{g8} - 2R_{g4} + R_{g2}}{2\sqrt{2}}\right|\right)^{-1} \quad (23\text{-}4)$$

Refer to FIG. 8 again. The edge indicators of color difference $e_{bi}$ i=1~4 can be obtained with Equations (24-1) to (24-4):

$$e_{b1} = \left(1 + \left|\frac{R_{g3} - R_{g1}}{2}\right| + \left|\frac{R_{g3} - 2R_{g1} + R_{g5}}{2}\right|\right)^{-1} \quad (24\text{-}1)$$

$$e_{b2} = \left(1 + \left|\frac{R_{g2} - R_{g4}}{2}\right| + \left|\frac{R_{g6} - 2R_{g2} + R_{g4}}{2}\right|\right)^{-1} \quad (24\text{-}2)$$

$$e_{b3} = \left(1 + \left|\frac{R_{g3} - R_{g1}}{2}\right| + \left|\frac{R_{g7} - 2R_{g3} + R_{g1}}{2}\right|\right)^{-1} \quad (24\text{-}3)$$

$$e_{b4} = \left(1 + \left|\frac{R_{g2} - R_{g4}}{2}\right| + \left|\frac{R_{g2} - 2R_{g4} + R_{g8}}{2}\right|\right)^{-1} \quad (24\text{-}4)$$

Then, the plane of the restored green color elements G is added to the plane of red color difference $R_g$ to obtain all the missing red color elements ($R = G + R_g$).

Restoring the Blue Color Elements

Figure 9:
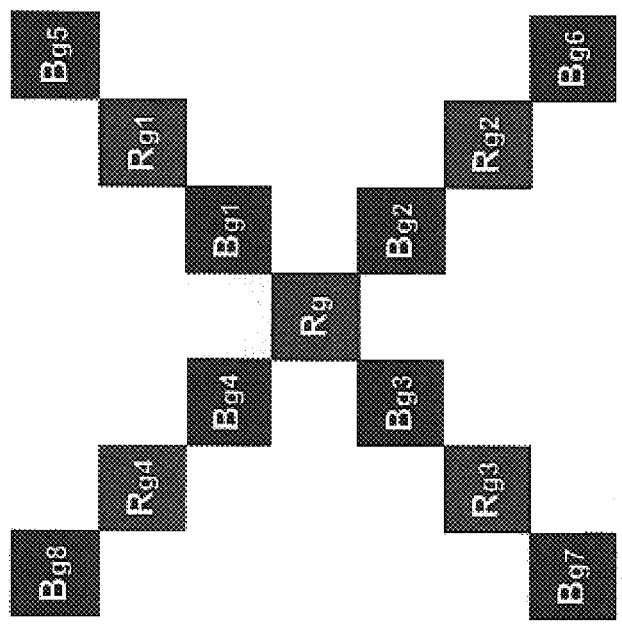
FIG. 9 is a diagram schematically showing the calculation for the missing blue color elements of the red pixels according to the present invention.

Refer to FIG. 9 a diagram schematically showing that the missing blue color elements of the red pixels are worked out according to the method of the present invention. For restoring the blue color elements of the red pixels, the bilinear interpolation method is used to preliminarily restore all the missing red color elements, and the plane of the restored green color elements is subtracted from the plane of the preliminarily restored red color elements to obtain a color-difference plane $B_g$ ($B_g=B-G$) therebetween. The missing blue color element of a red pixel is worked out with Equation (25):

$$B_g = \frac{e_{a1}\hat{B}_{g1} + e_{a2}\hat{B}_{g2} + e_{a3}\hat{B}_{g3} + e_{a4}\hat{B}_{g4}}{e_{a1} + e_{a2} + e_{a3} + e_{a4}} \quad (25)$$

wherein $\hat{B}_{gi}$ i=1~4 denotes the adjusted value of blue color difference, and $e_{ai}$ i=1~4 denotes the edge indicator of color difference.

Figure 10:
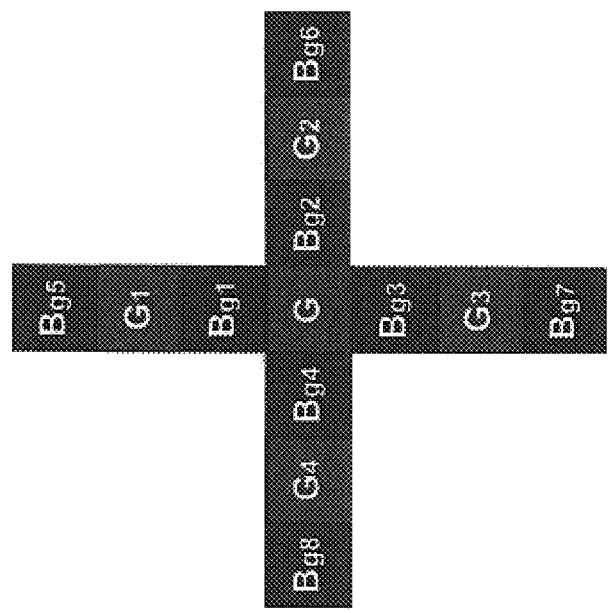
FIG. 10 is a diagram schematically showing the calculation for the missing blue color elements of the green pixels according to the present invention.

Refer to FIG. 10 a diagram schematically showing that the missing blue color elements of the green pixels are worked out according to the method of the present invention. The restored green color elements and the restored blue color elements of the red pixels are used to restore the missing blue color elements of the green pixels. If the position of a green pixel ($x_G, y_G$) belongs to the smooth subset $\Omega_s$, the missing blue color element of the green pixel is worked out with Equation (26):

$$B_g = \frac{e_{b1}\hat{B}_{g1} + e_{b2}\hat{B}_{g2} + e_{b3}\hat{B}_{g3} + e_{b4}\hat{B}_{g4}}{e_{b1} + e_{b2} + e_{b3} + e_{b4}} \quad (26)$$

If the position of a green pixel ($x_G, y_G$) belongs to the horizontal subset $\Omega_h$, the missing blue color element of the green pixel is worked out with Equation (27):

$$B_g = \frac{e_{b2}\hat{B}_{g2} + e_{b4}\hat{B}_{g4}}{e_{b2} + e_{b4}} \quad (27)$$

If the position of a green pixel ($x_G, y_G$) belongs to the vertical subset $\Omega_v$, the missing blue color element of the green pixel is worked out with Equation (28):

$$B_g = \frac{e_{b1}\hat{B}_{g1} + e_{b3}\hat{B}_{g3}}{e_{b1} + e_{b3}} \quad (28)$$

The adjusted values of blue color difference $\hat{B}_{gi}$ i=1~4 in Equations (25) to (28) can be worked out with Equations (29-1) to (29-4):

$$\hat{B}_{g1} = B_{g1} + \frac{B_{g3} - B_{g1}}{2} \quad (29-1)$$

$$\hat{B}_{g2} = B_{g2} + \frac{B_{g4} - B_{g2}}{2} \quad (29-2)$$

$$\hat{B}_{g3} = B_{g3} + \frac{B_{g1} - B_{g3}}{2} \quad (29-3)$$

$$\hat{B}_{g4} = B_{g4} + \frac{B_{g2} - B_{g4}}{2} \quad (29-4)$$

Refer to FIG. 9 again. The edge indicators of color difference $e_{ai}$ i=1~4 can be obtained with Equations (30-1) to (30-4):

$$e_{a1} = \left(1 + \left|\frac{B_{g1} - B_{g3}}{2\sqrt{2}}\right| + \left|\frac{R_{g5} - 2R_{g1} + R_{g3}}{2\sqrt{2}}\right|\right)^{-1} \quad (30-1)$$

$$e_{a2} = \left(1 + \left|\frac{B_{g4} - B_{g2}}{2\sqrt{2}}\right| + \left|\frac{B_{g4} - 2B_{g2} + B_{g6}}{2\sqrt{2}}\right|\right)^{-1} \quad (30-2)$$

$$e_{a3} = \left(1 + \left|\frac{B_{g1} - B_{g3}}{2\sqrt{2}}\right| + \left|\frac{B_{g1} - 2B_{g3} + B_{g7}}{2\sqrt{2}}\right|\right)^{-1} \quad (30-3)$$

$$e_{a4} = \left(1 + \left|\frac{B_{g4} - B_{g2}}{2\sqrt{2}}\right| + \left|\frac{B_{g8} - 2B_{g4} + B_{g2}}{2\sqrt{2}}\right|\right)^{-1} \quad (30-4)$$

Refer to FIG. 10 again. The edge indicators of color difference $e_{bi}$ i=1~4 can be obtained with Equations (31-1) to (31-4):

$$e_{b1} = \left(1 + \left|\frac{B_{g3} - B_{g1}}{2}\right| + \left|\frac{B_{g3} - 2B_{g1} + B_{g5}}{2}\right|\right)^{-1} \quad (31-1)$$

$$e_{b2} = \left(1 + \left|\frac{B_{g2} - B_{g4}}{2}\right| + \left|\frac{B_{g6} - 2B_{g2} + B_{g4}}{2}\right|\right)^{-1} \quad (31-2)$$

$$e_{b3} = \left(1 + \left|\frac{B_{g3} - B_{g1}}{2}\right| + \left|\frac{B_{g7} - 2B_{g3} + B_{g1}}{2}\right|\right)^{-1} \quad (31-3)$$

$$e_{b4} = \left(1 + \left|\frac{B_{g2} - B_{g4}}{2}\right| + \left|\frac{B_{g2} - 2B_{g4} + B_{g8}}{2}\right|\right)^{-1} \quad (31-4)$$

Then, the plane of the restored green color elements G is added to the plane of blue color difference $B_g$ to obtain all the missing blue color elements ($B=G+B_g$).

In Step S5, the plane of the obtained red color elements and the plane of the obtained blue color elements are used to correct the existing plane of the green color elements. The color-difference plane the between the planes of the green color elements and the red color elements and the color-difference plane between the planes of the green color elements and the blue color elements can be obtained with Equation (32):

$$G_r = G - R, \; G_b = G - B \quad (32)$$

Figure 11:
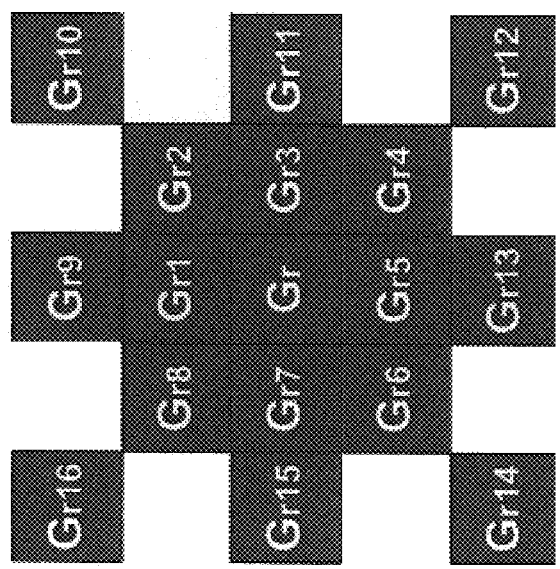
FIG. 11 is a diagram schematically showing the calculation for a new color-difference plane $G_r$.

Refer to FIG. 11 a diagram schematically showing that a new color-difference plane $G_r$ is worked out according to the method of the present invention. The new color-difference plane $G_r$ can be obtained with Equation (33):

$$G_r = \sum_{j=1}^{8} w_j G_{rj}, \quad (33)$$

$$w_j = \frac{e_{cj}}{\sum_{k=1}^{8} e_{ck}}$$

wherein $e_{cj}$ j=1~8 is the edge indicator of color difference. The edge indicators of color difference $e_{cj}$ j=1~8 can be obtained with Equations (34-1) to (34-8):

$$e_{c1} = \left(1 + \left|\frac{G_{r5} - G_{r1}}{2}\right| + \left|\frac{G_r - G_{r9}}{2}\right|\right)^{-1} \quad (34-1)$$

-continued $$e_{c2} = \left(1 + \left|\frac{G_{r2} - G_{r6}}{2\sqrt{2}}\right| + \left|\frac{G_{r10} - G_r}{\sqrt{2}}\right|\right)^{-1} \quad (34\text{-}2)$$

$$e_{c3} = \left(1 + \left|\frac{G_{r3} - G_{r7}}{2}\right| + \left|\frac{G_{r11} - G_r}{2}\right|\right)^{-1} \quad (34\text{-}3)$$

$$e_{c4} = \left(1 + \left|\frac{G_{r8} - G_{r4}}{2\sqrt{2}}\right| + \left|\frac{G_r - G_{r12}}{\sqrt{2}}\right|\right)^{-1} \quad (34\text{-}4)$$

$$e_{c5} = \left(1 + \left|\frac{G_{r5} - G_{r1}}{2}\right| + \left|\frac{G_{r13} - G_r}{2}\right|\right)^{-1} \quad (34\text{-}5)$$

$$e_{c6} = \left(1 + \left|\frac{G_{r2} - G_{r6}}{2\sqrt{2}}\right| + \left|\frac{G_r - G_{r14}}{\sqrt{2}}\right|\right)^{-1} \quad (34\text{-}6)$$

$$e_{c7} = \left(1 + \left|\frac{G_{r3} - G_{r7}}{2}\right| + \left|\frac{G_r - G_{r15}}{\sqrt{2}}\right|\right)^{-1} \quad (34\text{-}7)$$

$$e_{c8} = \left(1 + \left|\frac{G_{r8} - G_{r4}}{2\sqrt{2}}\right| + \left|\frac{G_{r16} - G_r}{\sqrt{2}}\right|\right)^{-1} \quad (34\text{-}8)$$

Figure 12:
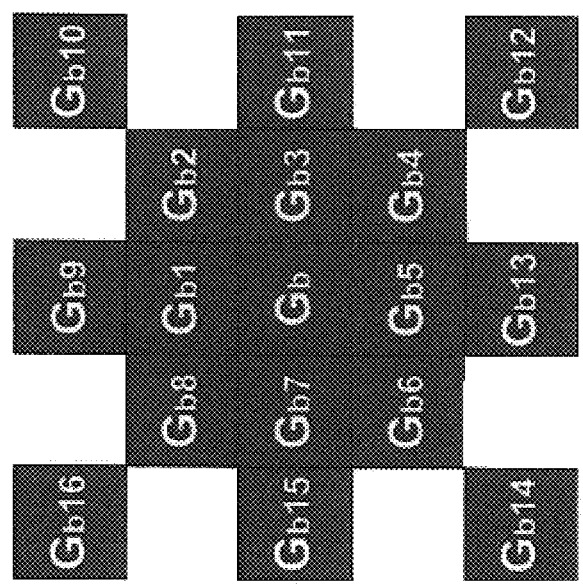
FIG. 12 is a diagram schematically showing the calculation for a new color-difference plane $G_b$.

Refer to FIG. 12 a diagram schematically showing that a new color-difference plane $G_b$ is worked out according to the method of the present invention. The new color-difference plane $G_b$ can be obtained with Equation (35):

$$G_b = \sum_{j=1}^{8} w_j G_{bj}, \quad (35)$$

$$w_j = \frac{e_{cj}}{\sum_{k=1}^{8} e_{ck}}$$

wherein $e_{cj}$ j=1~8 is the edge indicator of color difference. The edge indicators of color difference $e_{cj}$ j=1~8 can be obtained with Equations (36-1) to (36-8):

$$e_{c1} = \left(1 + \left|\frac{G_{b5} - G_{b1}}{2}\right| + \left|\frac{G_b - G_{b9}}{2}\right|\right)^{-1} \quad (36\text{-}1)$$

$$e_{c2} = \left(1 + \left|\frac{G_{b2} - G_{b6}}{2\sqrt{2}}\right| + \left|\frac{G_{b10} - G_b}{\sqrt{2}}\right|\right)^{-1} \quad (36\text{-}2)$$

$$e_{c3} = \left(1 + \left|\frac{G_{b3} - G_{b7}}{2}\right| + \left|\frac{G_{b11} - G_b}{2}\right|\right)^{-1} \quad (36\text{-}3)$$

$$e_{c4} = \left(1 + \left|\frac{G_{b8} - G_{b4}}{2\sqrt{2}}\right| + \left|\frac{G_b - G_{b12}}{\sqrt{2}}\right|\right)^{-1} \quad (36\text{-}4)$$

$$e_{c5} = \left(1 + \left|\frac{G_{b5} - G_{b1}}{2}\right| + \left|\frac{G_{b13} - G_b}{2}\right|\right)^{-1} \quad (36\text{-}5)$$

$$e_{c6} = \left(1 + \left|\frac{G_{b2} - G_{b6}}{2\sqrt{2}}\right| + \left|\frac{G_b - G_{b14}}{\sqrt{2}}\right|\right)^{-1} \quad (36\text{-}6)$$

$$e_{c7} = \left(1 + \left|\frac{G_{b3} - G_{b7}}{2}\right| + \left|\frac{G_b - G_{b15}}{\sqrt{2}}\right|\right)^{-1} \quad (36\text{-}7)$$

$$e_{c8} = \left(1 + \left|\frac{G_{b8} - G_{b4}}{2\sqrt{2}}\right| + \left|\frac{G_{b16} - G_b}{\sqrt{2}}\right|\right)^{-1} \quad (38\text{-}8)$$

The color-corrected plane of the green color elements can be obtained with Equation (37):

$$G = \frac{(G_r + R) + (G_b + B)}{2} \quad (37)$$

Figure 13:
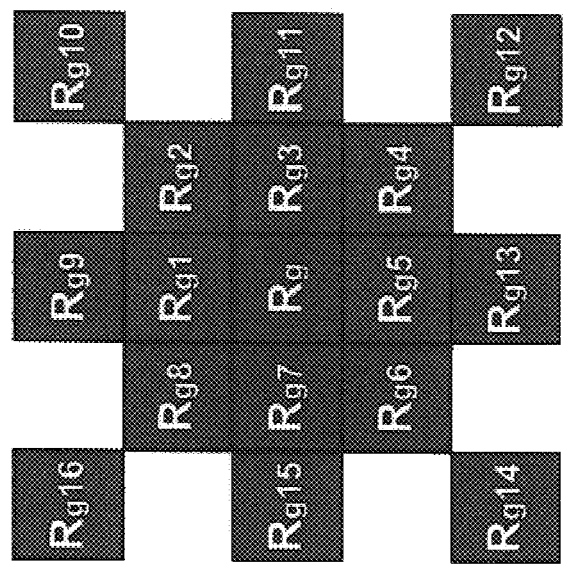
FIG. 13 is a diagram schematically showing the calculation for a new color-difference plane $R_g$.

In Step S6, the color-modified plane of the green color elements obtained in Step S5 is used to correct the existing planes of the red color elements and the blue color elements respectively. The color-difference plane the between the planes of the red color elements and the green color elements and the color-difference plane between the planes of the blue color elements and the green color elements can be obtained with Equation (38):

$$R_g = R - G, \ B_g = B - G \quad (38)$$

wherein G is the color-corrected plane of the green color elements obtained in Step S5. Refer to FIG. 13 a diagram schematically showing that a new color-difference plane $R_g$ is worked out according to the method of the present invention. The new color-difference plane $R_g$ can be obtained with Equation (39):

$$R_g = \sum_{j=1}^{8} w_j R_{gj}, \quad (39)$$

$$w_j = \frac{e_{cj}}{\sum_{k=1}^{8} e_{ck}}$$

wherein $e_{cj}$ j=1~8 is the edge indicator of color difference. The edge indicators of color difference $e_{cj}$ j=1~8 can be obtained with Equations (40-1) to (40-8):

$$e_{c1} = \left(1 + \left|\frac{R_{g5} - R_{g1}}{2}\right| + \left|\frac{R_g - R_{g9}}{2}\right|\right)^{-1} \quad (40\text{-}1)$$

$$e_{c2} = \left(1 + \left|\frac{R_{g2} - R_{g6}}{2\sqrt{2}}\right| + \left|\frac{R_{g10} - R_g}{\sqrt{2}}\right|\right)^{-1} \quad (40\text{-}2)$$

$$e_{c3} = \left(1 + \left|\frac{R_{g3} - R_{g7}}{2}\right| + \left|\frac{R_{g11} - R_g}{2}\right|\right)^{-1} \quad (40\text{-}3)$$

$$e_{c4} = \left(1 + \left|\frac{R_{g8} - R_{g4}}{2\sqrt{2}}\right| + \left|\frac{R_g - R_{g12}}{\sqrt{2}}\right|\right)^{-1} \quad (40\text{-}4)$$

$$e_{c5} = \left(1 + \left|\frac{R_{g5} - R_{g1}}{2}\right| + \left|\frac{R_{g13} - R_g}{2}\right|\right)^{-1} \quad (40\text{-}5)$$

$$e_{c6} = \left(1 + \left|\frac{R_{g2} - R_{g6}}{2\sqrt{2}}\right| + \left|\frac{R_g - R_{g14}}{\sqrt{2}}\right|\right)^{-1} \quad (40\text{-}6)$$

$$e_{c7} = \left(1 + \left|\frac{R_{g3} - R_{g7}}{2}\right| + \left|\frac{G_g - G_{g15}}{\sqrt{2}}\right|\right)^{-1} \quad (40\text{-}7)$$

$$e_{c8} = \left(1 + \left|\frac{R_{g8} - R_{g4}}{2\sqrt{2}}\right| + \left|\frac{G_{g16} - G_g}{\sqrt{2}}\right|\right)^{-1} \quad (40\text{-}8)$$

Figure 14:
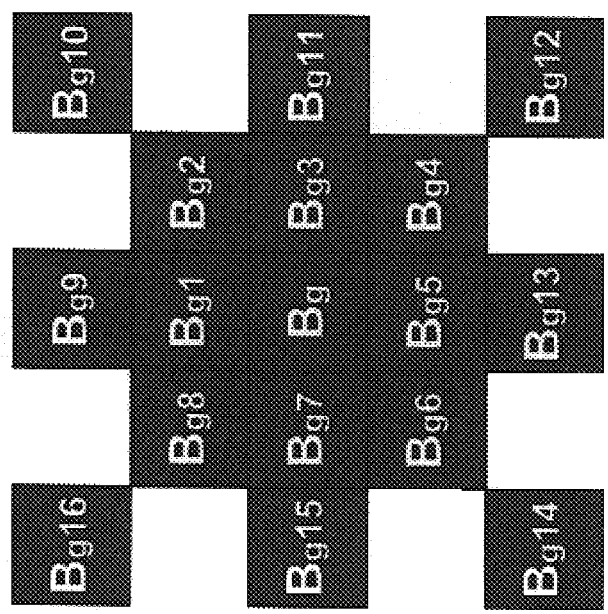
FIG. 14 is a diagram schematically showing the calculation for a new color-difference plane $B_g$.

Refer to FIG. 14 a diagram schematically showing that a new color-difference plane $B_g$ is worked out according to the method of the present invention. The new color-difference plane $B_g$ can be obtained with Equation (41):

$$B_g = \sum_{j=1}^{8} w_j B_{gj}, \quad (41)$$

$$w_j = \frac{e_{cj}}{\sum_{k=1}^{8} e_{ck}}$$

wherein $e_{cj}$ j=1~8 is the edge indicator of color difference. The edge indicators of color difference $e_{cj}$ j=1~8 can be obtained with Equations (42-1) to (42-8):

$$e_{c1} = \left(1 + \left|\frac{B_{g5} - B_{g1}}{2}\right| + \left|\frac{B_g - B_{g9}}{2}\right|\right)^{-1} \quad (42\text{-}1)$$

$$e_{c2} = \left(1 + \left|\frac{B_{g2} - B_{g6}}{2\sqrt{2}}\right| + \left|\frac{B_{g10} - B_g}{\sqrt{2}}\right|\right)^{-1} \quad (42\text{-}2)$$

$$e_{c3} = \left(1 + \left|\frac{B_{g3} - B_{g7}}{2}\right| + \left|\frac{B_{g11} - B_g}{2}\right|\right)^{-1} \quad (42\text{-}3)$$

$$e_{c4} = \left(1 + \left|\frac{B_{g8} - B_{g4}}{2\sqrt{2}}\right| + \left|\frac{B_g - B_{g12}}{\sqrt{2}}\right|\right)^{-1} \quad (42\text{-}4)$$

$$e_{c5} = \left(1 + \left|\frac{B_{g5} - B_{g1}}{2}\right| + \left|\frac{B_{g13} - B_g}{2}\right|\right)^{-1} \quad (42\text{-}5)$$

$$e_{c6} = \left(1 + \left|\frac{B_{g2} - B_{g6}}{2\sqrt{2}}\right| + \left|\frac{B_g - B_{g14}}{\sqrt{2}}\right|\right)^{-1} \quad (42\text{-}6)$$

$$e_{c7} = \left(1 + \left|\frac{B_{g3} - B_{g7}}{2}\right| + \left|\frac{B_g - B_{g15}}{\sqrt{2}}\right|\right)^{-1} \quad (42\text{-}7)$$

$$e_{c8} = \left(1 + \left|\frac{B_{g8} - B_{g4}}{2\sqrt{2}}\right| + \left|\frac{B_{g16} - B_g}{\sqrt{2}}\right|\right)^{-1} \quad (42\text{-}8)$$

The color-corrected plane of the red color elements and the color-corrected plane of the blue color elements are obtained with Equation (43):

$$R = G + R_g, \quad B = G + B_g \quad (43)$$

In Step S7, Step S5 and Step S6 are repeated one to three times to obtain a color-corrected digital color image.

Figure 15:
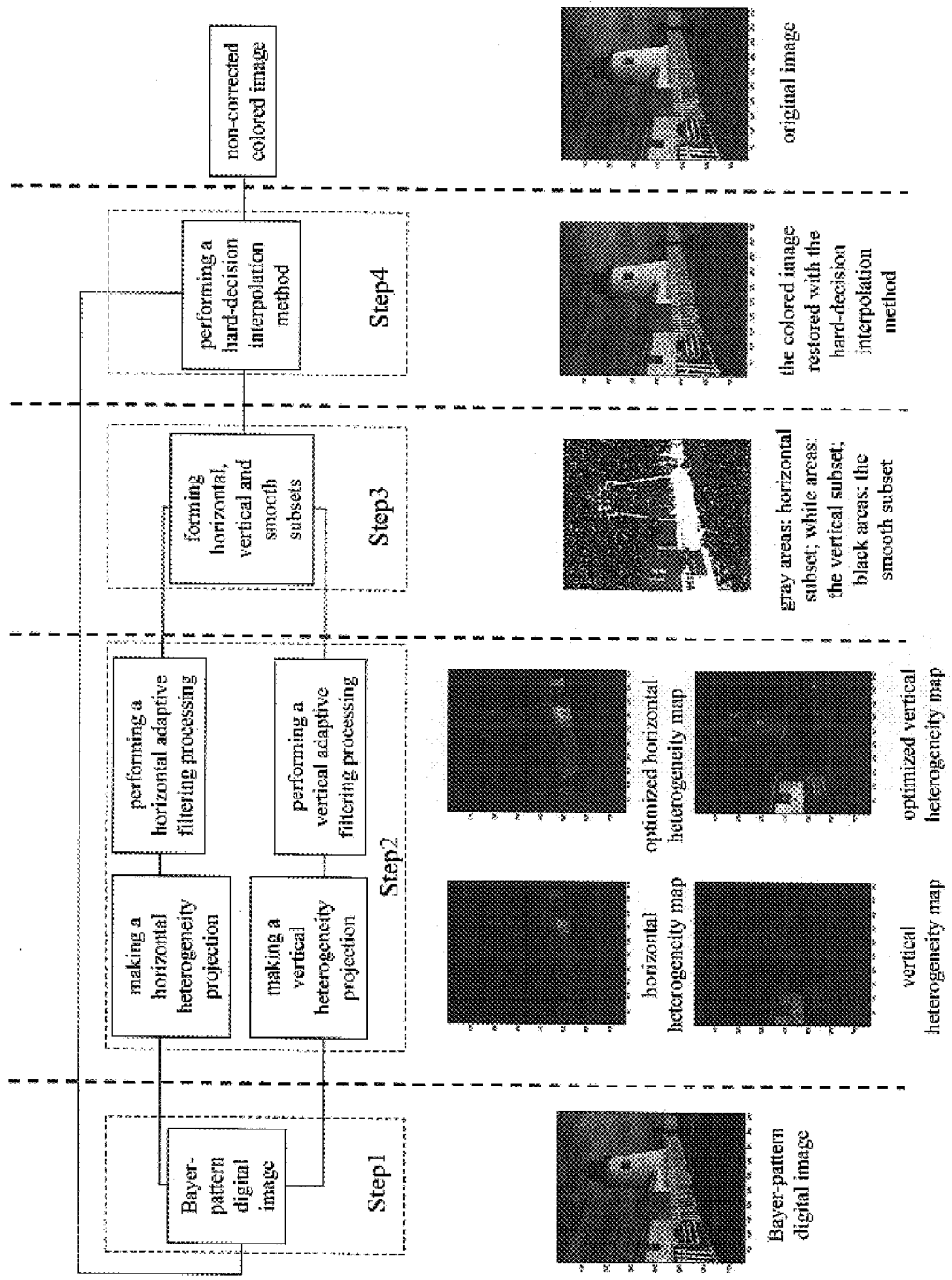
FIG. 15 is a diagram showing the flowchart of the process of from Step S1 to Step S4 and the results of the process.
Figure 16:
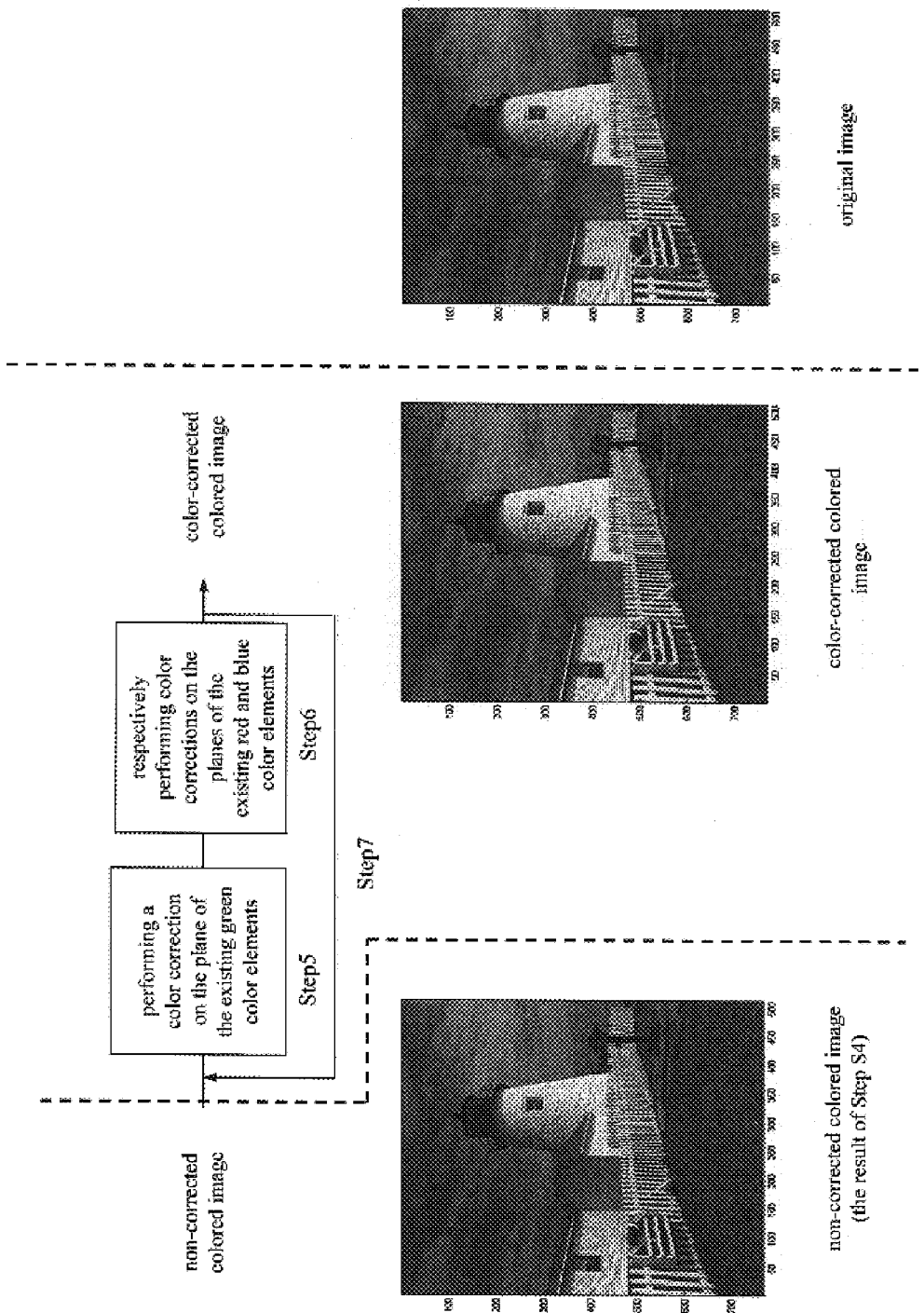
FIG. 16 is a diagram showing the flowchart of the process of from Step S5 to Step S7 and the results of the process.

Refer to FIG. 15 for the process of from Step S1 to Step S4 and the results of the process. Refer to FIG. 16 for the process of from Step S5 to Step S7 and the results of the process. The present invention utilizes the abovementioned heterogeneity-projection technology and the hard-decision rule to determine the optimal interpolation direction to reduce the color distortion and texture distortion of the digital image caused by the incorrect interpolation direction. Further, the present invention restores the color elements lost in the process that light passes through the CFA and makes the reproduced colors of the digital color image more close to the original colors.

Figure 17:
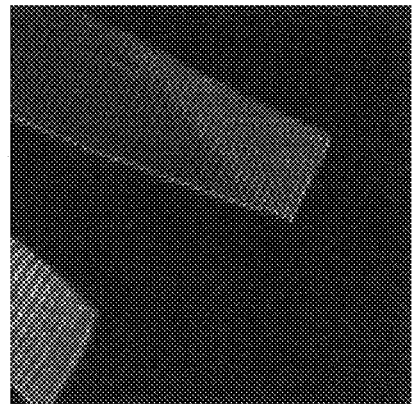
FIGS. 17(A) to 17(D) are diagrams to compare the result of the method of the present invention with the results of other methods.
Figure 17:
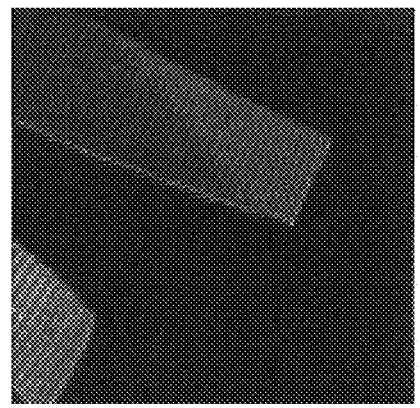
Figure 17:
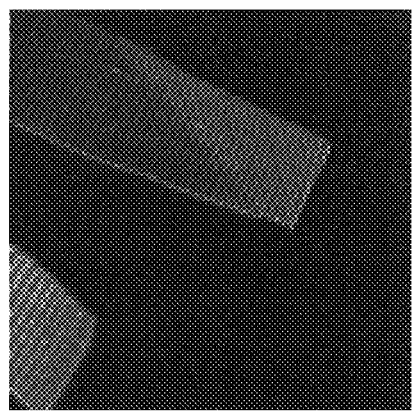
Figure 17:
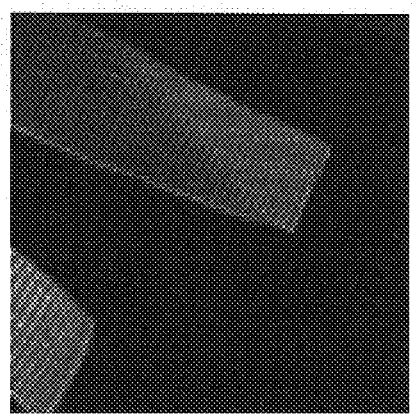
Figure 18:
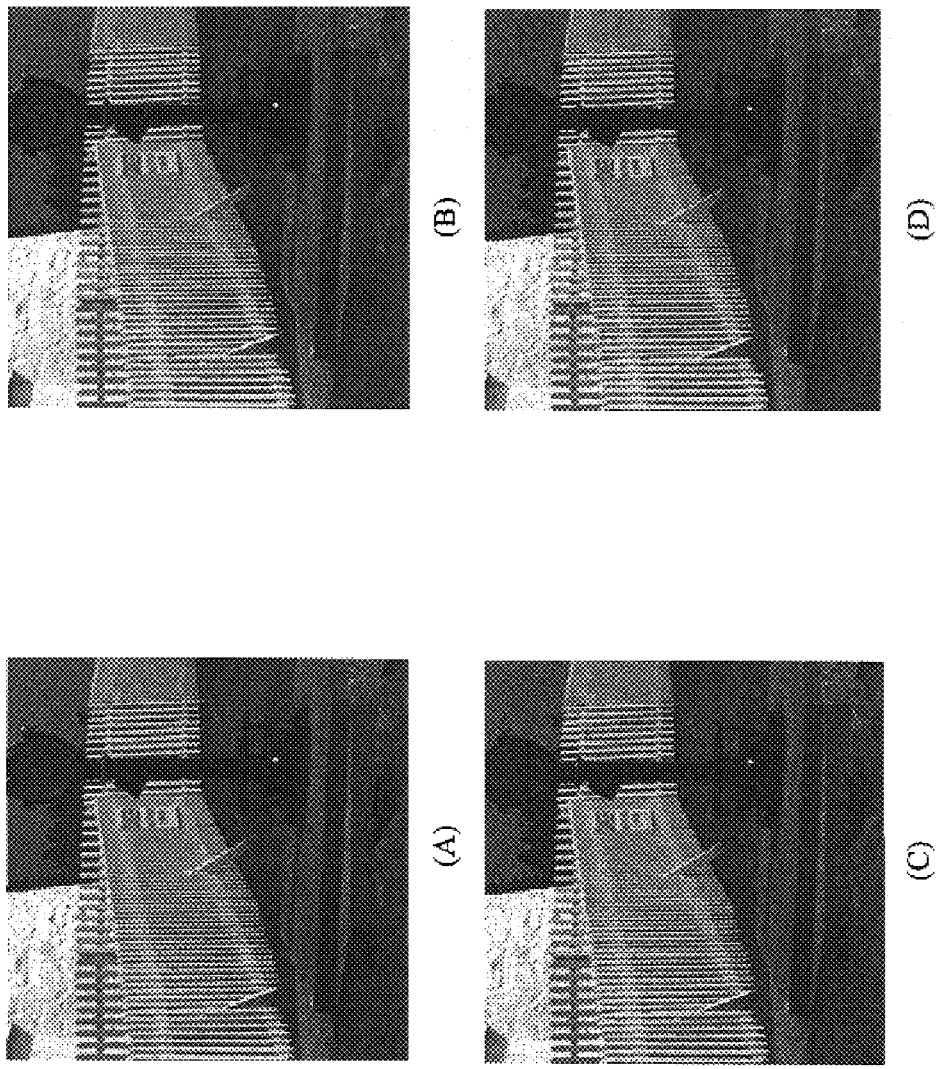
FIGS. 18(A) to 18(D) are further diagrams to compare the result of the method of the present invention with the results of other methods.

Refer to FIGS. 17(A) to 17(D) diagrams to compare the result of the method of the present invention with the results of other methods. FIG. 17(A) is the original image. FIG. 17(B) is the image demosaiced with the method proposed by Gunturk, and the PSNR (Peak Signal to Noise Ratio) thereof is 33.7776 dB. FIG. 17(C) is the image demosaiced with the method proposed by Lu, and the PSNR thereof is 32.2664 dB. FIG. 17(D) is the image demosaiced with the method proposed by the present invention, and the PSNR thereof is 34.9164 dB. Refer to FIGS. 18(A) to 18(D) further diagrams to compare the result of the method of the present invention with the results of other methods. FIG. 18(A) is the original image. FIG. 18(B) is the image demosaiced with the method proposed by Gunturk (2002), and the PSNR thereof is 31.9619 dB. FIG. 18(C) is the image demosaiced with the method proposed by Lu, and the PSNR thereof is 32.2929 dB. FIG. 18(D) is the image demosaiced with the method proposed by the present invention, and the PSNR thereof is 35.5103 dB.

Figure 19:
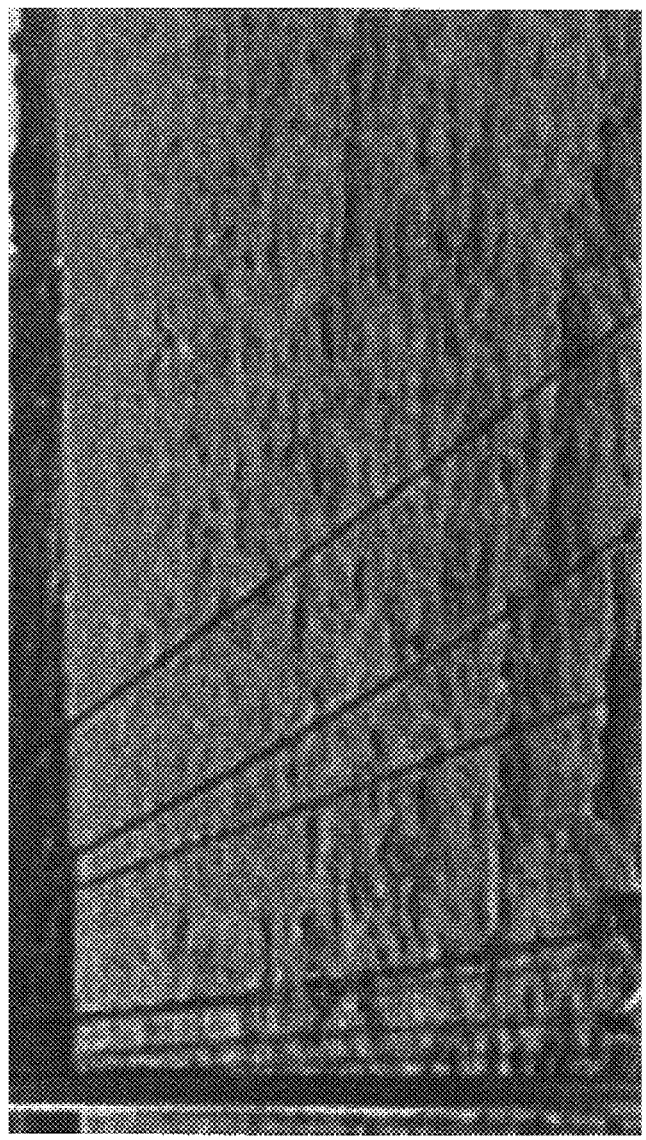
FIG. 19 is the image demosaiced by Lu's method.
Figure 20:
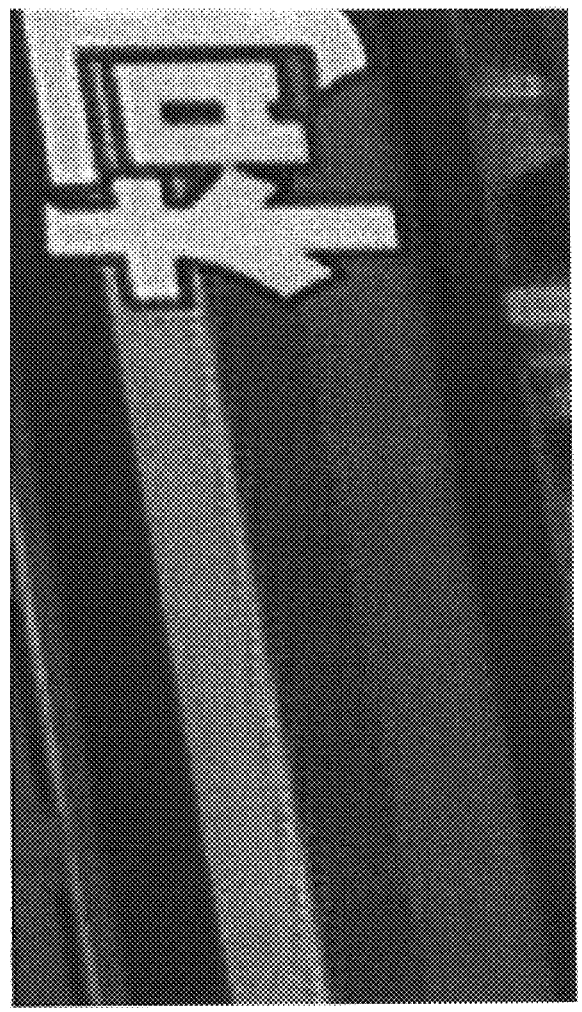
FIG. 20 is the image demosaiced by Gunturk's method.
Figure 21:
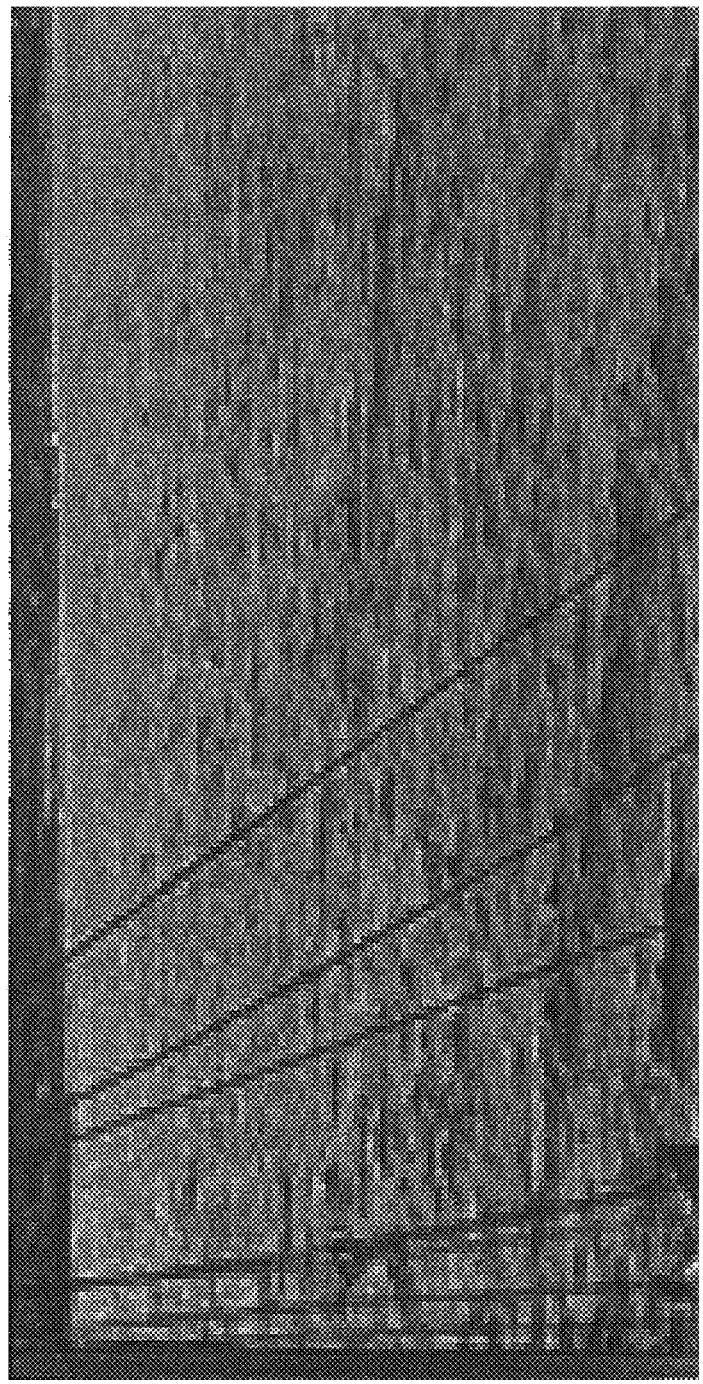
FIG. 21 is the image demosaiced by the method of present invention.
Figure 22:
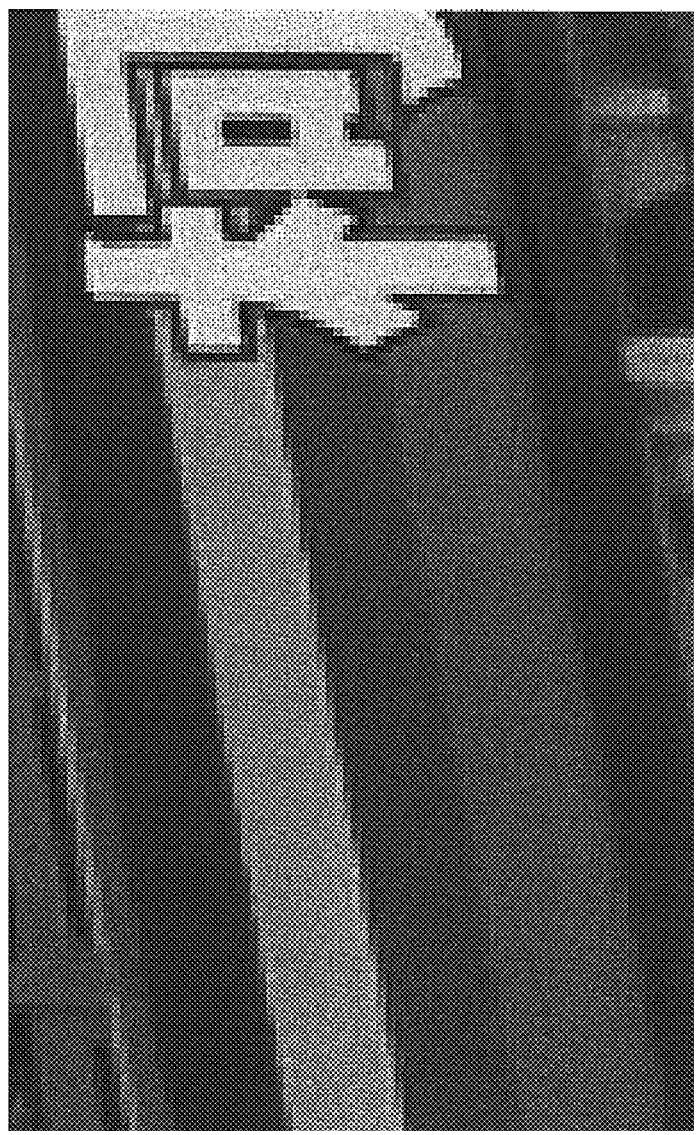
FIG. 22 is the image demosaiced by the method of present invention.

FIG. 19 shows the image demosaiced by Lu's method. In FIG. 19, one can see that several visible color artifacts are resided in the texture region of the demosaiced color image. FIG. 20 shows the image demosaiced by Gunturk's method. In FIG. 20, one can see that several visible color artifacts are resided in the edge region of the demosaiced color image. FIGS. 21 and 22 show the image demosaiced by the method of present invention. It is clear that the visible color artifacts resided in the demosaiced image are reduced efficiently.

Those described above are the embodiments to exemplify the present invention to enable the persons skilled in the art to understand, make and use the present invention. However, it is not intended to limit the scope of the present invention. Therefore, any equivalent modification and variation according to the spirit of the present invention is to be also included within the scope of the claims of the present invention stated below.

What is claimed is:

1. A heterogeneity-projection hard-decision interpolation method for color reproduction, comprising the following steps:
    (a) acquiring an image to form an original digital image, which consists of a plurality of pixels, including a plurality of red pixels, blue pixels and green pixels;
    (b) utilizing a heterogeneity-projection method to make projections of said original digital image along horizontal and vertical directions to form horizontal and vertical heterogeneity maps, and utilizing an image-restoration method to obtain optimized said horizontal and vertical heterogeneity maps;
    (c) utilizing said optimized horizontal and vertical heterogeneity maps to form horizontal, vertical and smooth subsets according to a hard-decision rule;
    (d) respectively performing horizontal, vertical and mean interpolations inside said horizontal, vertical and smooth subsets to reproduce all missing color elements;
    (e) utilizing current red color elements of said pixels and current blue color elements of said pixels to correct current green color elements of said pixels to obtain a color-corrected plane of green color elements;
    (f) utilizing said color-corrected plane of green color elements of said pixels to correct current red color elements of said pixels and current blue color elements of said pixels to obtain a color-corrected plane of red color elements and a color-corrected plane of blue color elements; and
    (g) repeating Steps (e) and (f) at least once to obtain a color-calibrated digital image;
    wherein each of the steps (b) through (g) are performed by an electronic apparatus.

2. The heterogeneity-projection hard-decision interpolation method for color reproduction according to claim 1, wherein in Step (a), a single CCD (Charge Coupled Device) and a Bayer-pattern CFA (Color Filter Array) are used to obtain a Bayer-pattern digital image.

3. The heterogeneity-projection hard-decision interpolation method for color reproduction according to claim 1, wherein each said pixel of said original digital image only has gray-level value of a single color element.

4. The heterogeneity-projection hard-decision interpolation method for color reproduction according to claim 1, wherein in Step (b), said horizontal and vertical heterogeneity maps are respectively horizontally and vertically filtered with said image-restoration method to obtain said optimized horizontal and vertical heterogeneity maps.

5. The heterogeneity-projection hard-decision interpolation method for color reproduction according to claim 1, wherein said image-restoration method is a mean-filter method, a median-filter method or an adaptive-filter method.

6. The heterogeneity-projection hard-decision interpolation method for color reproduction according to claim 1, wherein in Step (c), a scalar factor and said optimized horizontal and vertical heterogeneity maps are used to separate said horizontal, vertical and smooth subsets from said original digital image according to said hard-decision rule.

7. The heterogeneity-projection hard-decision interpolation method for color reproduction according to claim 6, wherein said scalar factor is within 0 to 1.

8. The heterogeneity-projection hard-decision interpolation method for color reproduction according to claim 1, wherein in Step (d), a fixed type image interpolation method or a non-fixed type image interpolation method is used to perform a horizontal interpolation inside said horizontal subset, a vertical interpolation inside said vertical subset, and a mean interpolation inside said smooth subset.

9. The heterogeneity-projection hard-decision interpolation method for color reproduction according to claim 1, wherein in Step (d), a hard-decision interpolation method is used to perform a horizontal interpolation inside said horizontal subset, a vertical interpolation inside said vertical subset, and a mean interpolation inside said smooth subset.

10. The heterogeneity-projection hard-decision interpolation method for color reproduction according to claim 9, wherein said hard-decision interpolation method firstly restores missing green color elements for said pixels of said original digital image and then uses the restored green color elements to restore missing red and blue color elements for said pixels.

11. The heterogeneity-projection hard-decision interpolation method for color reproduction according to claim 10, wherein said "restores missing green color elements for said pixels of said original digital image" is to restore missing green color elements of said red and blue pixels of said original digital image and includes the following steps:
   calculating color-adjusted values and the corresponding weight values of four surrounding green pixels of each said red pixel and each said blue pixel; and
   utilizing said horizontal, vertical and smooth subsets to determine optimal interpolation direction.

12. The heterogeneity-projection hard-decision interpolation method for color reproduction according to claim 11, wherein said weight value is calculated from edge indicators of said surrounding green pixels of each said red pixel or each said blue pixel.

13. The heterogeneity-projection hard-decision interpolation method for color reproduction according to claim 12, wherein said edge indicator may be a given value or calculated from information of neighboring elements.

14. The heterogeneity-projection hard-decision interpolation method for color reproduction according to claim 11, wherein process of determining optimal interpolation direction includes following steps:
   when position of one pixel losing its green color elements belongs to said smooth subset, green color elements of said pixel (a red pixel or a blue pixel) are calculated from said color-adjusted values and said corresponding weight values;
   when position of one pixel losing its green color elements belongs to said horizontal subset, green color elements of said pixel (a red pixel or a blue pixel) are calculated from said horizontal interpolation; and
   when position of one pixel losing its green color elements belongs to said vertical subset, green color elements of said pixel (a red pixel or a blue pixel) are calculated from said vertical interpolation.

15. The heterogeneity-projection hard-decision interpolation method for color reproduction according to claim 10, wherein restoring the missing red color elements includes the following steps:
   utilizing a bilinear interpolation method to preliminarily restore all missing red color elements of said pixels of said original digital image and generate a plane of the preliminarily restored red color elements;
   subtracting the plane of restored green color elements from the plane of said preliminarily restored red color elements to obtain a color-difference plane;
   working out the color-difference value of missing red color elements of all said blue pixels;
   utilizing acquired missing red color elements of all said blue pixels, and said horizontal, vertical and smooth subsets to determine optimal interpolation direction and then work out color-difference values of missing red color elements of all said green pixels; and
   utilizing said color-difference plane and said green color elements to work out missing red color elements of all said pixels.

16. The heterogeneity-projection hard-decision interpolation method for color reproduction according to claim 10, wherein restoring missing blue color elements includes the following steps:
   utilizing a bilinear interpolation method to preliminarily restore all missing blue color elements of said pixels of said original digital image and generate a plane of the preliminarily restored blue color elements;
   subtracting the plane of restored green color elements from the plane of said preliminarily restored blue color elements to obtain a color-difference plane;
   working out color-difference values of missing blue color elements of all said red pixels;
   utilizing acquired missing blue color elements of all said red pixels, and said horizontal, vertical and smooth subsets to determine optimal interpolation direction and then work out color-difference values of missing blue color elements of all said green pixels; and
   utilizing said color-difference plane and said green color elements to work out missing blue color elements of all said pixels.

17. The heterogeneity-projection hard-decision interpolation method for color reproduction according to claim 1, wherein Step (e) further comprises the following steps:
   working out a first color-difference plane between planes of green color elements and red color elements;

working out a second color-difference plane between planes of green color elements and blue color elements; and utilizing said first and second color-difference planes to work out said color-corrected plane of green color elements.

18. The heterogeneity-projection hard-decision interpolation method for color reproduction according to claim 1, wherein Step (f) further comprises the following steps:

working out a first color-difference plane between planes of green color elements and red color elements;

working out a second color-difference plane between planes of green color elements and blue color elements;

utilizing said first and second color-difference planes to work out said color-corrected plane of red color elements and said color-corrected plane of blue color elements.

19. The heterogeneity-projection hard-decision interpolation method for color reproduction according to claim 1, wherein in Step (g), Steps (e) and (f) are repeated one to three times.

* * * * *

UNITED STATES PATENT AND TRADEMARK OFFICE
CERTIFICATE OF CORRECTION

PATENT NO. : 7,609,307 B2 Page 1 of 1
APPLICATION NO. : 11/519959
DATED : October 27, 2009
INVENTOR(S) : Tsai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Twelfth Day of October, 2010

David J. Kappos
*Director of the United States Patent and Trademark Office*